United States Patent
Kim et al.

(10) Patent No.: US 9,226,128 B2
(45) Date of Patent: Dec. 29, 2015

(54) METHOD AND SYSTEM FOR SESSION BASED DATA MONITORING FOR WIRELESS EDGE CONTENT CACHING NETWORKS

(71) Applicant: LSI Corporation, San Jose, CA (US)

(72) Inventors: Seong-Hwan Kim, Allentown, PA (US); Sundar Vedantham, Allentown, PA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 106 days.

(21) Appl. No.: 14/074,812

(22) Filed: Nov. 8, 2013

(65) Prior Publication Data

US 2015/0117226 A1 Apr. 30, 2015

Related U.S. Application Data

(60) Provisional application No. 61/896,693, filed on Oct. 29, 2013.

(51) Int. Cl.
*H04W 4/26* (2009.01)
*H04M 15/00* (2006.01)

(52) U.S. Cl.
CPC ............... *H04W 4/26* (2013.01); *H04M 15/58* (2013.01)

(58) Field of Classification Search
None
See application file for complete search history.

(56) References Cited

U.S. PATENT DOCUMENTS

| | | | |
|---|---|---|---|
| 2009/0083303 A1* | 3/2009 | Singh | G06Q 30/04 |
| 2010/0034089 A1* | 2/2010 | Kovvali et al. | 370/235 |
| 2011/0082946 A1* | 4/2011 | Gopalakrishnan | 709/231 |
| 2012/0082131 A1* | 4/2012 | Agrawal | H04W 36/08 370/331 |
| 2012/0159558 A1* | 6/2012 | Whyte et al. | 725/95 |
| 2012/0184258 A1* | 7/2012 | Kovvali | H04W 4/18 455/418 |
| 2013/0121324 A1* | 5/2013 | Kalmbach et al. | 370/338 |
| 2013/0151652 A1* | 6/2013 | Brech | 709/216 |
| 2014/0079049 A1* | 3/2014 | Friman et al. | 370/338 |
| 2014/0219179 A1* | 8/2014 | Zakrzewski | 370/328 |
| 2014/0359048 A1* | 12/2014 | Vikberg et al. | 709/213 |
| 2015/0016256 A1* | 1/2015 | Skog et al. | 370/235 |

OTHER PUBLICATIONS

Seong Kim; Extensibility: The Key to Maximizing Caching Investments; Oct. 15, 2012; pp. 1-33.
Seong Hwan Kim; Addressing the data deluge challenge in mobile networks with intelligent content caching; Jun. 7, 2013; pp. 1-4; ECN Magazine, http://www.ecnmag.com/articles/2013/06/addressing-data-deluge-challenge-mobilenetworks-intelligent-content-caching.
Mobile Caching Needed to Manage Mobile Traffic Overload, Heavy Reading Finds; http://www.prnewswire.com/news-releases/mobile-caching-needed-to-manage-mobile-traffic-overload-heavyreading-finds-162732596.html.

* cited by examiner

*Primary Examiner* — Duc Duong

(57) ABSTRACT

Aspects of the disclosure pertain to methods and systems that are configured to monitor data usage at a network edge. In an implementation, a method includes monitoring data usage information associated with a mobile user session between a mobile device and a plurality of edges nodes of a communication network, where the plurality of edge nodes includes at least a beginning edge node and a final edge node. The method also includes storing data usage information from the monitored data usage information, the stored data usage information including data associated with the transfer of cached data stored at the plurality of edge nodes. The method further includes forwarding the stored data access information to a central database of the communication network.

20 Claims, 3 Drawing Sheets

METHOD AND SYSTEM FOR SESSION BASED DATA MONITORING FOR WIRELESS EDGE CONTENT CACHING NETWORKS

FIELD OF THE INVENTION

The present disclosure relates to the field of network systems and particularly to session based billing on edge content caching networks.

BACKGROUND

In networks, resources and information are shared by computers and user terminals which are interconnected by communication channels. One of the resources that is shared over networks (e.g., mobile networks) is data content, such as audio content (e.g., digital audio files) and video content (e.g., mobile video, over-the-top video). The access of data shared over a network is tracked, particularly by networks that limit access to data by individuals using the network.

SUMMARY

Aspects of the disclosure pertain to methods and systems that are configured to monitor data usage at a network edge. In an implementation, a method includes monitoring data usage information associated with a mobile user session between a mobile device and a plurality of edges nodes of a communication network, where the plurality of edge nodes includes at least a beginning edge node and a final edge node. The method also includes storing data usage information from the monitored data usage information, the stored data usage information including data associated with the transfer of cached data stored at the plurality of edge nodes. The method further includes forwarding the stored data access information to a central database of the communication network.

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

BRIEF DESCRIPTION OF THE FIGURES

The Written Description is described with reference to the accompanying figures. The use of the same reference numbers in different instances in the description and the figures may indicate similar or identical items.

WRITTEN DESCRIPTION

Embodiments of the invention will become apparent with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be facilitated by methods, devices, and/or embodied in articles of commerce. The following detailed description is, therefore, not to be taken in a limiting sense.

Figure 1:
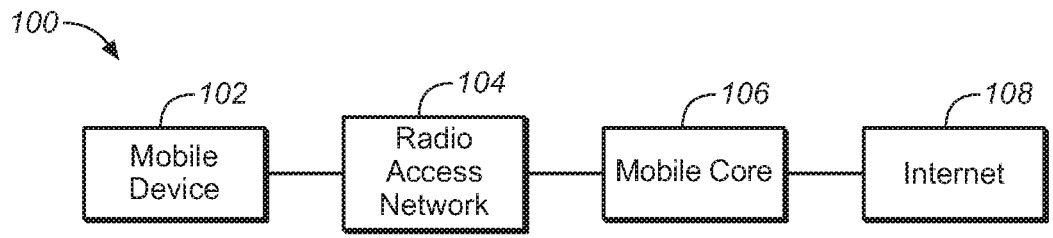
FIG. 1 is a block diagram of a communication network in accordance with an example implementation of the present disclosure.

Referring to FIG. 1, a block diagram of a communication network 100 is shown in accordance with an example embodiment of the present disclosure. As shown, the communication network 100 includes a mobile device 102 (e.g., mobile phone, tablet, laptop, or other mobile computing device), a radio access network 104, a mobile core 106, and the Internet 108. In embodiments, the communication network 100 is a collection of computers and other hardware interconnected by communication channels that allow sharing of resources and information (e.g., video files, mobile video, audio files). In embodiments, the communication network 100 is a wireless network (e.g., mobile network). As shown, the mobile device 102 is communicatively coupled to the radio access network 104, which is communicatively coupled to the mobile core 106, which is communicatively coupled to the Internet 108. In embodiments, the mobile device 102 is configured for accessing a service (e.g., providing data content to the mobile device 102) made available by a server or database provided in the communication network 100. While the communication network 100 is shown with connectivity to the Internet 108, it is contemplated that the communication network 100 operates via any suitable communication protocol and with any suitable data content storage/communication system, including but not necessarily limited to: a wide-area cellular telephone network, such as a 3G cellular network, a 4G cellular network (including a long term evolution (LTE) standard), or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to be restrictive of the present disclosure. Further, the mobile device 102 can be configured to communicate with a single network or multiple networks across different access points.

In embodiments, the Radio Access Network 104 provides a communicative coupling between the mobile device 102 and the mobile core 106 (or core network). In embodiments, the Radio Access Network 104 includes one or more edge nodes configured for sending, receiving, and forwarding information between the mobile device 102 and the mobile core 106. In embodiments, the Radio Access Network 104 stores frequently accessed data in a cache storage such that the mobile device 102 accesses the cached data directly from the Radio Access Network rather through the mobile core 106 (which can also include cached data) or the Internet 108. By caching frequently accessed data content closer to the end user (e.g., closer to the mobile device 102), such as at the mobile core level or at the radio access network level, the data content can be served by local cached content to be accessed more rapidly by the end user than when accessed through the Internet 108 via the mobile core 106. By monitoring data usage at the mobile core level, the communication network 100 can overlook cached data content supplied from an edge node of the radio access network 104, resulting in incomplete records of data access.

Figure 2:
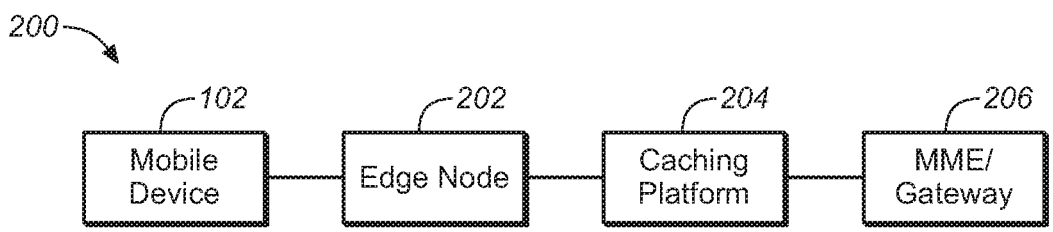
FIG. 2 is a block diagram of a communication network having an edge node in accordance with an example implementation of the present disclosure.

In embodiments, such as the embodiment shown in FIG. 2, a communication network 200 is configured to monitor data usage, including cached data, at the edge node level or radio access network level. As shown, communication network 200 includes the mobile device 102, an edge node 202, a caching platform 204, and a mobile management entity (MME)/gateway (GW) 206. The caching platform 204 is communicatively coupled between the edge node 202 and the MME/gateway 206 and is configured to store frequently accessed data at the edge node 202 for subsequent access by the mobile device 102. In embodiments, the caching platform 204 is co-located with the edge node 202. In embodiments, the edge node 202 is dependent on the communication protocol of the communication network 200. For example, in embodiments the edge node 202 is an eNodeB (e.g., E-UTRAN Node B, Evolved Node B) or a Radio Network Controller (RNC). In embodiments, the caching platform 204 is a component that transparently stores data (e.g., objects, object data) so that future requests for that data can be served faster, where in embodiments, the caching platform 204 is co-located with eNodeB or RNC. In embodiments, the caching platform 204 is used for temporary storage of data likely to be used again. Caching is valuable in that it reduces network bandwidth and improves the quality of experience for subscribers. In embodiments, data usage is monitored at the edge node 202 in order to account for access of data cached by the caching platform 204. For example, in embodiments, a flow level monitoring module (e.g., NetFlow, NetStream, IPFIX, and the like) is utilized to monitor the access of data at the edge node 202, and in particular, monitors the access of data cached by the caching platform 204. As will described with reference to FIG. 3, in embodiments, the usage data collected at each edge node of a communication network is reported directly to a central statistic collector, or a compilation of data is reported to the central statistic collector at the completion of a communication session of a mobile device.

Figure 3:
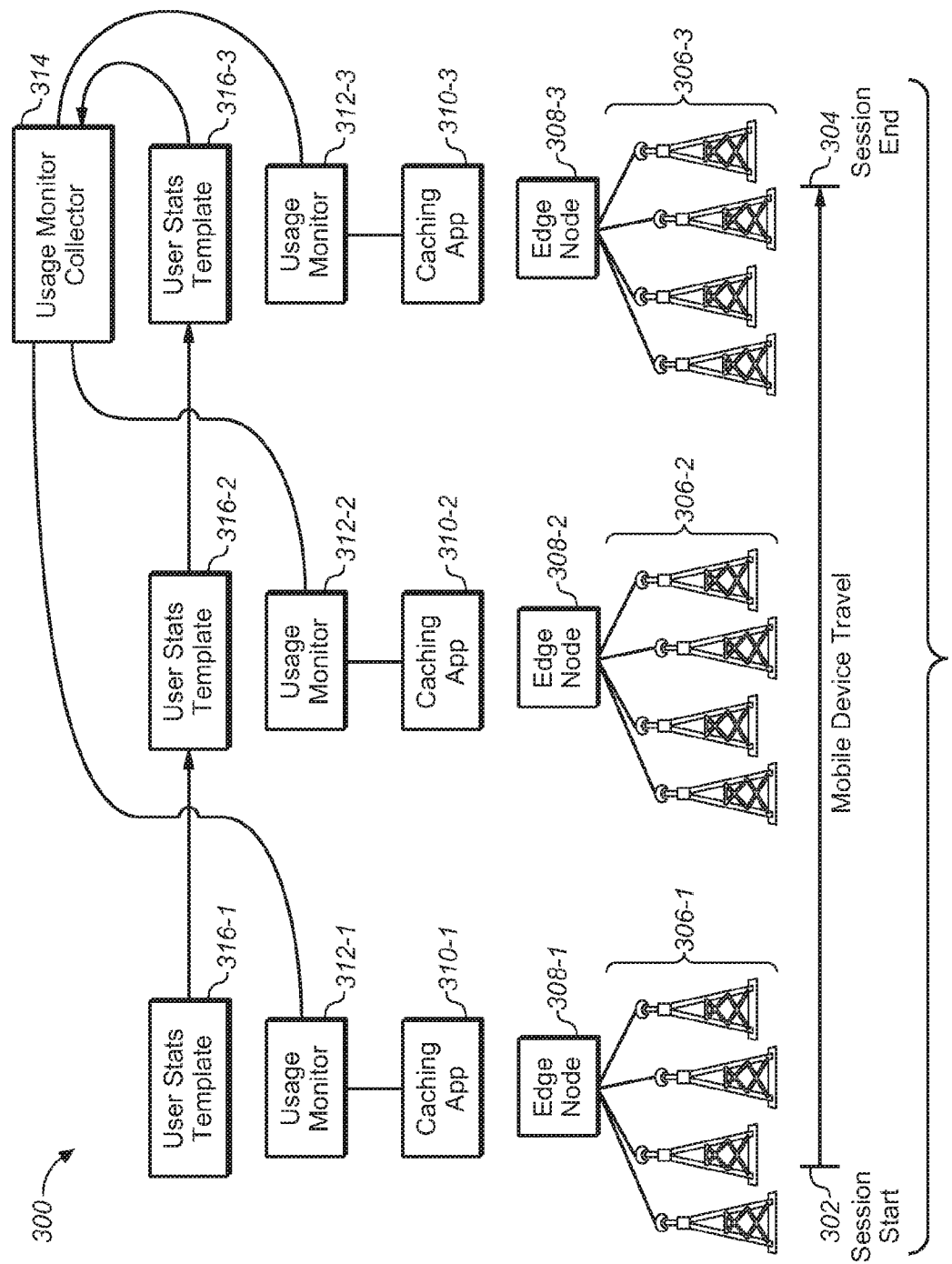
FIG. 3 is a schematic diagram of a communication network providing content to a mobile device that is traveling between communication towers in accordance with an example implementation of the present disclosure.

Referring now to FIG. 3, a schematic diagram of a communication network 300 providing content to a mobile device that is traveling between communication towers is shown in accordance with an example implementation of the present disclosure. As shown, a mobile device (such as mobile device 102) begins a communication session with communication network 300 at session start 302 and proceeds in a direction of travel to the session end 304 location. During travel from the session start 302 to the session end, the mobile device encounters a number of communication towers 306 (shown as 306-1, 306-2, and 306-3), which in embodiments are cellular communication towers. In embodiments, the mobile device begins a session at one tower (such as 306-1) and is transferred to another tower (such as one or more of 306-2 and 306-3) when the mobile device is positioned within range of the subsequent tower during travel. Each communication tower 306 is communicatively coupled to one or more edge nodes 308 (shown as 308-1, 308-2, and 308-3), where communication towers 306-1 are communicatively coupled to edge nodes 308-1, communication towers 306-2 are communicatively coupled to edge nodes 308-2, and communication towers 306-3 are communicatively coupled to edge nodes 308-3. As such, the user's session can be served by multiple edge nodes 308 prior to termination of the session at the completion of the call. A session begins at session start 302 when the mobile device requests data content from the cache in the edge node 308-1. As described, certain data content can be cached at an edge node, such that a caching application 310 (shown as 310-1, 310-2, and 310-3) is configured to manage cached data content for the edge nodes 308. The communication network 300 includes a usage monitor 312 (shown as 312-1, 312-2, and 312-3) configured to monitor the data usage of the mobile device at the edge nodes. As shown, the usage monitor 312-1 is communicatively coupled to caching application 310-1 and is configured to monitor the data usage of the mobile device from edge nodes 308-1 as the mobile device communicates with communication towers 306-1. The usage monitor 312-2 is communicatively coupled to caching application 310-2 and is configured to monitor the data usage of the mobile device from edge nodes 308-2 as the mobile device communicates with communication towers 306-2. The usage monitor 312-3 is communicatively coupled to caching application 310-3 and is configured to monitor the data usage of the mobile device from edge nodes 308-3 as the mobile device communicates with communication towers 306-3. In embodiments, the usage monitor 312 and the caching application 310 are modules loaded in the edge node 308 platform.

When the session begins at session start 302, the usage monitor 312-1 begins collecting usage data associated with edge nodes 308-1. In embodiments, the collected usage data is sent from the usage monitor 312 to a usage monitor collector 314. In embodiments, the usage monitor collector 314 is incorporated in the mobile core level, such as in the MME or a packet data network (PDN) gateway. The MME is configured to manage and store user equipment (UE) (e.g., mobile devices) contextual data, including, but not limited to, UE identity, UE mobility state, user security parameters, and the like). The PDN gateway is configured to perform policy enforcement, packet filtering for each user, charging support, lawful interception, packet screening, and the like. The PDN gateway is configured provide connectivity between the UE and external packet data networks by functioning as a point of exit and entry of traffic for the UE. In embodiments, the UE has connectivity with more than one PDN gateway for accessing multiple PDNs. In embodiments, the usage monitor 312 tracks data usage associated with data cached at the edge node 308 (or other nodes closer to the user than the mobile core 106) and stores the information in a user statistics template 316 (shown as 316-1, 316-2, and 316-3) as a table entry in a data table implemented in hardware and/or software.

In embodiments, when the mobile device moves to a different communication tower 306 (e.g., from communication towers 306-1 to communication towers 306-2), the user data collected by the usage monitor 312 and stored in the user stats template 316 is transferred to the next usage monitor 312 (e.g., the data collected by the usage monitor 312-1 is transferred to the usage monitor 312-2 to be stored in the user stats template 316-2). In embodiments, if the session continues while the mobile device moves to another communication tower 306 (e.g., from communication towers 306-2 to communication towers 306-3), the cumulative data collected from the usage monitors 312 (e.g., the data collected by the usage monitor 312-1 and by the usage monitor 312-2 and stored in the user stats template 316-2) is transferred to the usage monitor 312 associated with the edge nodes 308 of the subsequent communication tower 306 (e.g., usage monitor 312-3). When a user finishes his/her communication session, the user statistics template is forwarded to the usage monitoring collector 314. In other words, all the user data usages during the entire communication session (from 302 to 304) will get forwarded to the collector 314. This can avoid any duplicated counts that may occur during the communication session, and can monitor data service provided by all edge nodes. In embodiments, the transfer of information between the communication towers 306 is carried out via a communication platform or interconnect interface, including but not limited to, a System Architecture Evolution (SAE) platform, the X2 interface, and the like.

In embodiments, the usage monitor 312 tracks usage data pertinent to the session and stores the data in the user stats template 316, where the data includes, but is not limited to, user identification; application type; amount of data (e.g., bytes) served from local cache (such as the edge node 308 cache, served by the caching app 310); security credentials; quality of service (QoS) parameters; data quality (e.g., high, medium, low, such as for streamed video content); whether retries were attempted (e.g., indicating poor radio interface); amount or portion of a particular data content viewed (e.g., was a video data content viewed completely, partially, from the beginning, from the middle, towards the end, etc.); and the like. In embodiments, the tracked data is maintained for each user of the communication system 300, such as in a tabular format.

Figure 4:
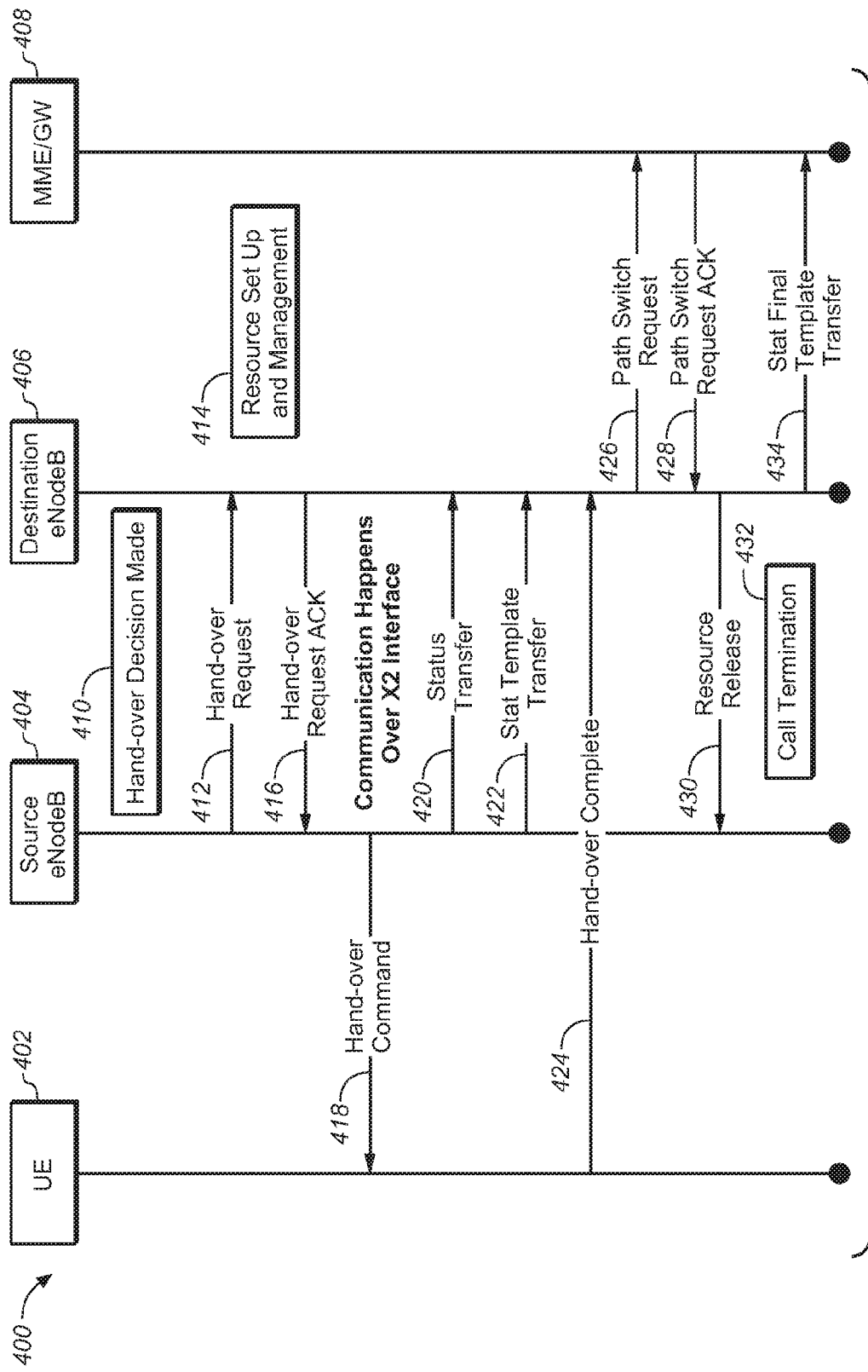
FIG. 4 is a schematic diagram of a communication network transferring collected data in accordance with an example implementation of the present disclosure.

Referring now to FIG. 4, a schematic diagram of a communication network 400 configured to transfer collected data is shown in accordance with an example implementation of the present disclosure. As shown, the communication network 400 includes user equipment (UE) 402, a source eNodeB 404, a destination eNodeB 406, and a mobile management entity (MME)/gateway (GW) 408. The UE 402 begins a session by accessing data from the source eNodeB 404. When the UE travels between communication towers (e.g., as described with reference to FIG. 3), a transfer of data occurs between the source eNodeB 404 and the destination eNodeB 406 as part of the communication hand-over. As shown, a hand-over decision is made 410 when the UE 402 transfers to range of a communication tower, such as a communication tower independent of the source eNodeB 404. Once the hand-over decision is made 410, a hand-over request 412 is sent from the source eNodeB 404 to the destination eNodeB 406. A resource set up and management is initiated at 414. In embodiments, the resource set up and management includes applications/protocols to manage the transfer of the session of the UE 402 and is performed by a mobile core, such as by the MME/GW 408. The destination eNodeB 406 provides an acknowledgment of the handover request at 416 to the source eNodeB 404. The source eNodeB 404 initiates a hand-over command at 418 to the UE 402. At 420, the source eNodeB 404 begins a status transfer to the destination eNodeB 406. At 422, the source eNodeB 404 begins a stat template transfer (e.g., as described with reference to FIG. 3). At 424, the UE 400 completes the hand-over. At 426, the destination eNodeB 406 initiates a path switch request to the MME/GW 408, and at 428 the MME/GW 408 returns a path switch request acknowledgment to the destination eNodeB 406. At 430, the destination eNodeB 406 initiates a resource release to the source eNodeB 404. At 432, the call of the UE terminates, upon which the destination eNodeB 406 initiates a stat final template transfer to the MME/GW 408 at 434. In embodiments, the stat final template transfer at 434 includes the cumulative data monitored during the call of the UE 402 (e.g., data tracked by usage monitor 312 and stored in user stats template 314).

Figure 5:
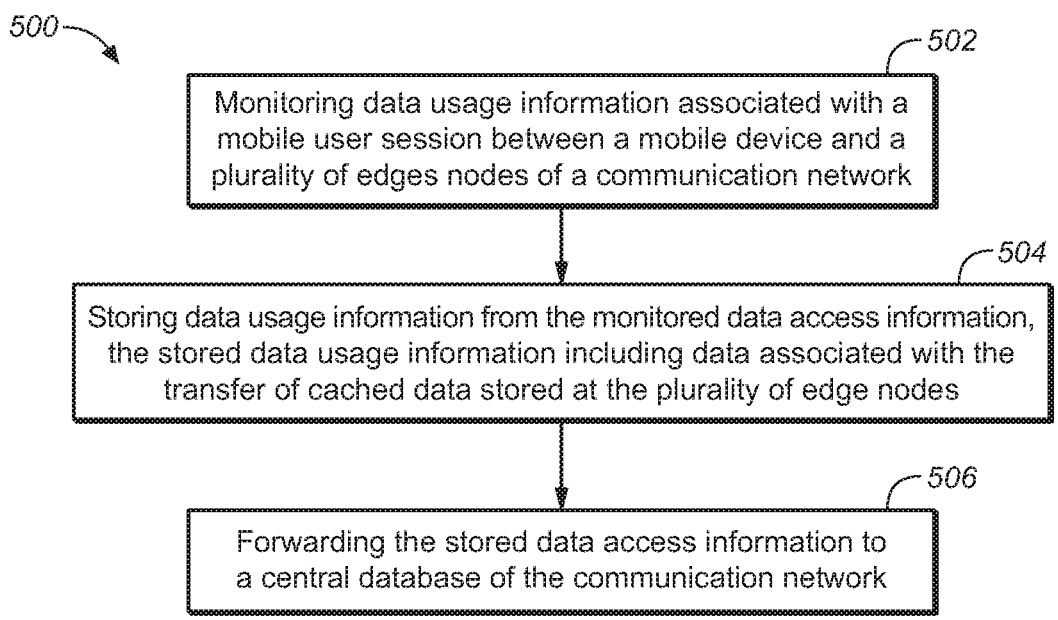
FIG. 5 is a flow chart illustrating a method for monitoring data usage at a network edge in accordance with an example implementation of the present disclosure.

Referring now to FIG. 5, a flow chart illustrating a method 500 for monitoring data usage at a network edge is shown in accordance with an example implementation of the present disclosure. Method 500 includes a step of monitoring data usage information associated with a mobile user session between a mobile device and a plurality of edges nodes of a communication network (Step 502). In embodiments, the plurality of edge nodes includes at least a beginning edge node and a final edge node. For example, in embodiments the usage monitor 312 monitors data access associated with a mobile session between a mobile device (e.g., mobile device 102, UE 402, etc.) and the edge node (e.g., edge node 202, edge node 308, etc.).

Method 500 further includes a step of storing data usage information from the monitored data usage information, where the stored data usage information includes data associated with the transfer of cached data stored at the plurality of edge nodes (Step 504). For example, in embodiments the stored data access information includes information associated with the transfer of data cached by the caching platform 204 from the edge node (e.g., edge node 202, edge node 308, etc.) to the mobile device (e.g., mobile device 102, UE 402, etc.).

Method 500 further includes a step of forwarding the stored access information to a central database of the communication network (Step 506). For example, in embodiments the usage monitor 312 forwards the stored access information to the usage monitor collector 314 (e.g., MME, GW, etc.).

It is to be noted that the foregoing described embodiments may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the embodiments described herein may be conveniently implemented in forms of a software package. Such a software package may be a computer program product which employs a non-transitory computer-readable storage medium including stored computer code which is used to program a computer to perform the disclosed functions and processes disclosed herein. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for monitoring data usage at a network edge comprising:
monitoring data usage information associated with a mobile user session between a mobile device and a plurality of edges nodes of a communication network, the plurality of edge nodes including at least a beginning edge node and a final edge node, the data usage information associated with the mobile user session including data usage information associated with cached data stored at an edge node of the plurality of edge nodes;
storing data usage information from the monitored data usage information, the stored data usage information including data associated with the transfer of cached data stored at the plurality of edge nodes; and
forwarding the stored data usage information to a central database of the communication network.

2. The method as recited in claim 1, further comprising:
transferring from the beginning edge node to the final edge node, the stored data access information associated with the transfer of cached data stored at the beginning edge node to the mobile device prior to forwarding the stored data usage information to the central database of the communication network.

3. The method as recited in claim 1, wherein the communication network includes one or more intermediate nodes associated with the transfer of cached data to the mobile device during the mobile user session.

4. The method as recited in claim 3, wherein the one or more intermediate edge nodes facilitate transfer of data to the mobile device during the mobile user session after the beginning edge node and prior to the final edge node.

5. The method of claim 3, further comprising:
monitoring data usage information associated with the mobile user session between the mobile device and each edge node of the communication network; and
storing the monitored data usage information associated with the mobile user session between the mobile device and each edge node of the communication network.

6. The method as recited in claim 5, further comprising:
transferring the stored data access information associated with the transfer of cached data stored at one of the one or more intermediate edge nodes to a subsequent intermediate edge node or the final edge node prior to forwarding the stored data usage information to the central database of the communication network.

7. The method of claim 6, further comprising:
storing the data usage information associated with cached data stored at an edge node of the plurality of edge nodes in a user statistics template; and
forwarding the stored data usage information from each edge node of the communication network to the central database of the communication network upon termination of the mobile user session.

8. A non-transitory computer-readable medium having computer-executable instructions for performing a method for monitoring data usage at a network edge, the method comprising:
monitoring data usage information associated with a mobile user session between a mobile device and a plurality of edges nodes of a communication network, the plurality of edge nodes including at least a beginning edge node and a final edge node, the data usage information associated with the mobile user session including data usage information associated with cached data stored at an edge node of the plurality of edge nodes;
storing data usage information from the monitored data usage information, the stored data usage information including data associated with the transfer of cached data stored at the plurality of edge nodes; and
forwarding the stored data usage information to a central database of the communication network.

9. The non-transitory computer-readable medium as recited in claim 8, the method further comprising:
transferring from the beginning edge node to the final edge node, the stored data access information associated with the transfer of cached data stored at the edges node to the mobile device prior to forwarding the stored data usage information to the central database of the communication network.

10. The non-transitory computer-readable medium as recited in claim 8, wherein the communication network includes one or more intermediate edge nodes associated with the transfer of cached data to the mobile device during the mobile user session.

11. The non-transitory computer-readable medium as recited in claim 10, the method further comprising:
monitoring data usage information associated with the mobile user session between the mobile device and each edge node of the communication network; and
storing the monitored data usage information associated with the mobile user session between the mobile device and each edge node of the communication network.

12. The non-transitory computer-readable medium as recited in claim 11, the method further comprising:
transferring the stored data access information associated with the transfer of cached data stored at one of the one or more intermediate nodes to a subsequent intermediate node or the final edge node prior to forwarding the stored data usage information to the central database of the communication network.

13. The non-transitory computer-readable medium as recited in claim 12, the method further comprising:
storing the data usage information associated with cached data stored at an edge node of the plurality of edge nodes in a user statistics template; and
forwarding the stored data usage information from each end node of the communication network to the central database of the communication network upon termination of the mobile user session.

14. A system for monitoring data usage at a network edge, the system comprising:
a processor;
a memory communicatively coupled to the processor, the memory having computer executable instructions stored thereon, the computer executable instructions configured for execution by the processor to:
monitor data usage information associated with a mobile user session between a mobile device and a plurality of edges nodes of a communication network, the plurality of edge nodes including at least a beginning edge node and a final edge node, the data usage information associated with the mobile user session including data usage information associated with cached data stored at an edge node of the plurality of edge nodes;
store data usage information from the monitored data usage information, the stored data usage information including data associated with the transfer of cached data stored at the plurality of edge nodes; and
forward the stored data usage information to a central database of the communication network.

15. The system as recited in claim 14, wherein the computer executable instructions are configured for execution by the processor to transfer, from the beginning edge node to the final edge node via intermediate edge nodes, the stored data access information associated with the transfer of cached data stored at the beginning edge node to the mobile device prior to forwarding the stored data usage information to the central database of the communication network.

16. The system as recited in claim 14, wherein the communication network includes one or more intermediate nodes associated with the transfer of cached data to the mobile device during the mobile user session.

17. The system as recited in claim 16, wherein the one or more intermediate edge nodes facilitate transfer of data to the mobile device during the mobile user session after the beginning edge node and prior to the final edge node.

18. The system as recited in claim 16, wherein the computer executable instructions are configured for execution by the processor to:
- monitor data usage information associated with the mobile user session between the mobile device and each end node of the communication network; and
- store the monitored data usage information associated with the mobile user session between the mobile device and each end node of the communication network.

19. The system as recited in claim 18, wherein the computer executable instructions are configured for execution by the processor to transfer the stored data access information associated with the transfer of cached data stored at one of the one or more intermediate nodes to a subsequent intermediate node or the final edge node prior to forwarding the stored data usage information to the central database of the communication network.

20. The system as recited in claim 19, wherein the computer executable instructions are configured for execution by the processor to:
- store the data usage information associated with cached data stored at an edge node of the plurality of edge nodes in a user statistics template; and
- forward the stored data usage information from each end node of the communication network to the central database of the communication network upon termination of the mobile user session.

* * * * *